Sept. 29, 1970　　　　　A. LANZA ET AL　　　　　3,530,565
DEVICE FOR REPLACING THE PLASTIC MATERIAL SHEATHS
OF CYLINDRICAL SPOOLS AND METHOD THEREFOR
Filed Dec. 27, 1967　　　　　　　　　　　　　　　　4 Sheets-Sheet 1

INVENTORS
ALBERTO LANZA
TIZIANO MILAN
MARIO PARACCHINI

Mason, Porter, Diller & Brown
ATTORNEYS

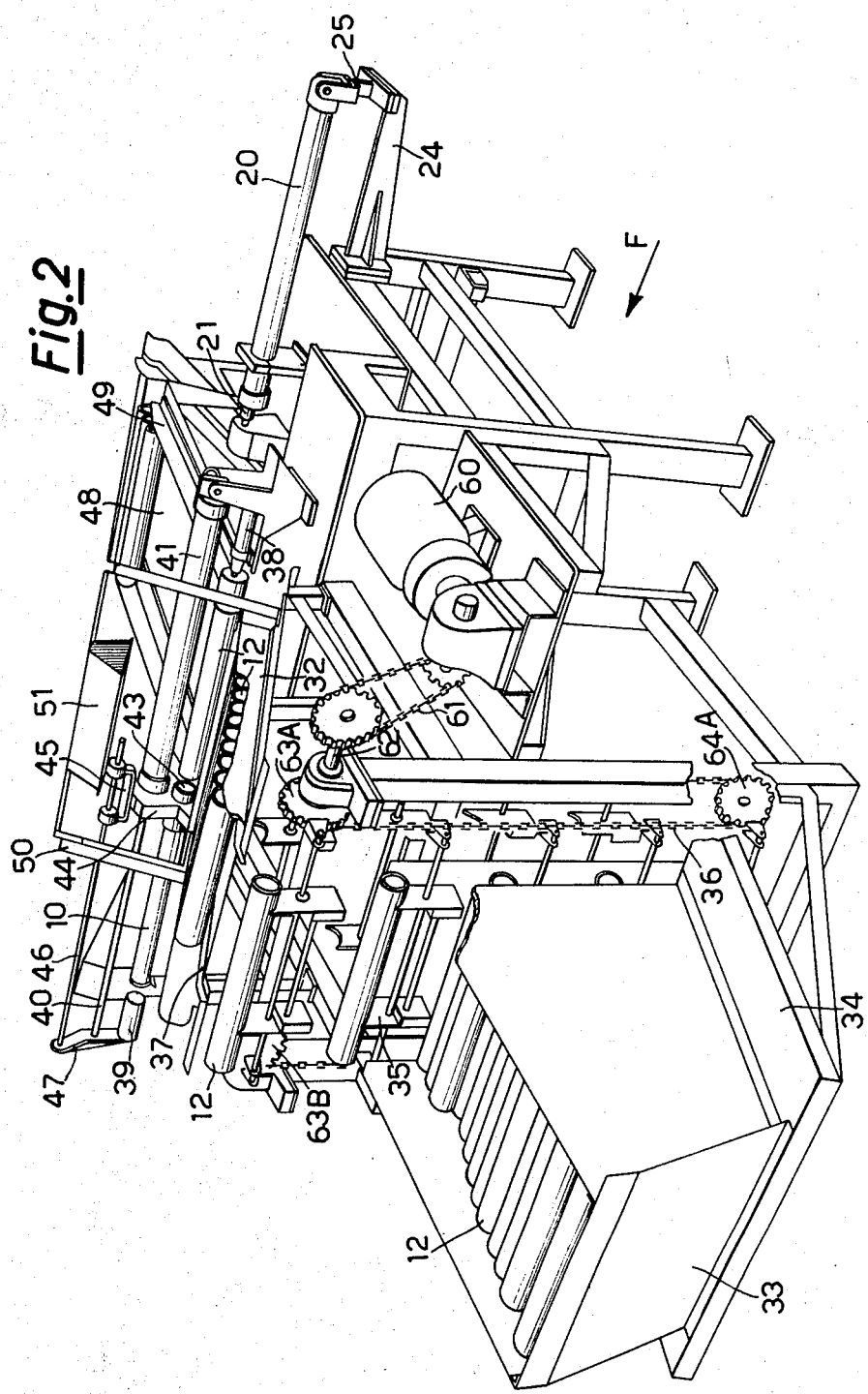

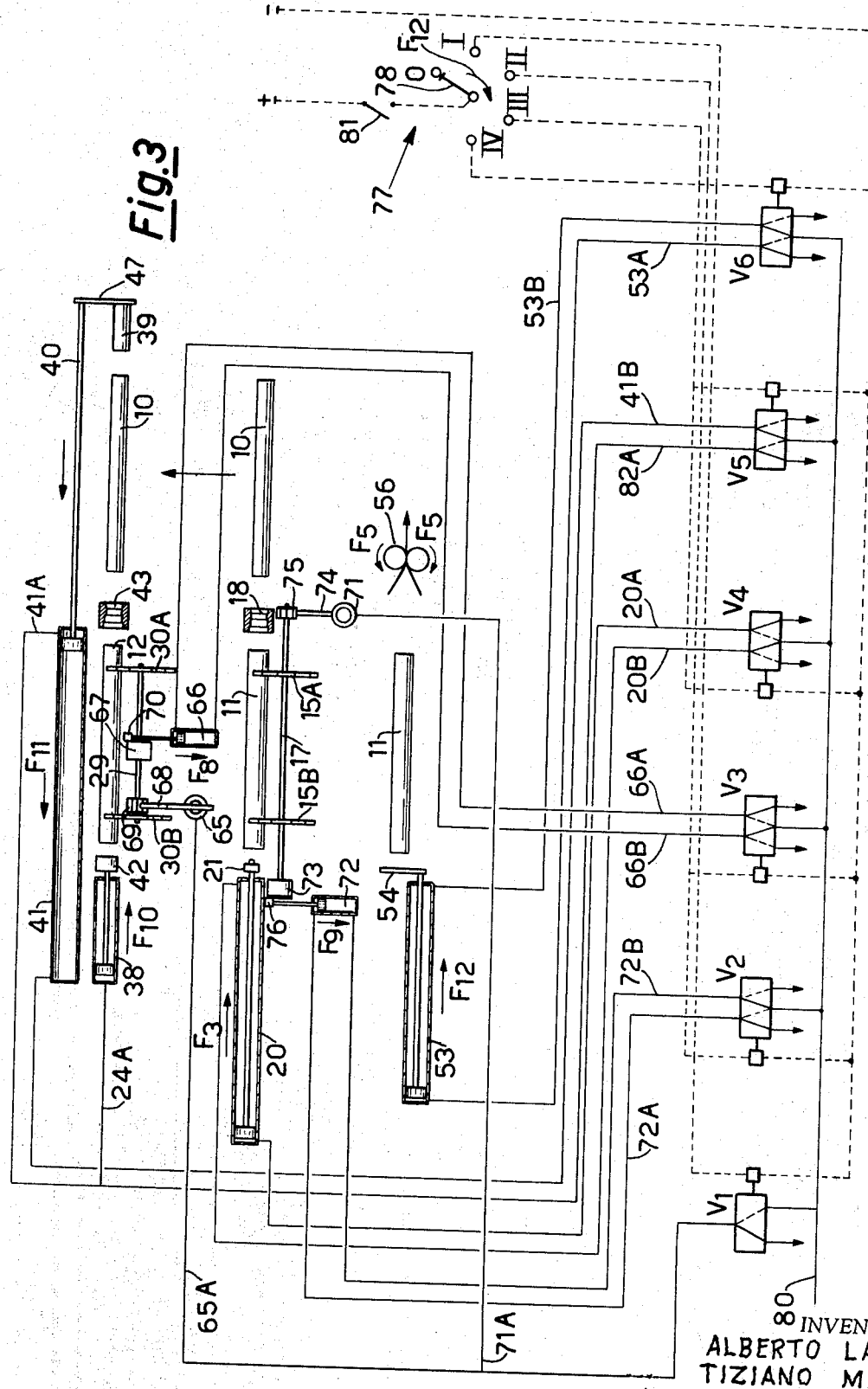

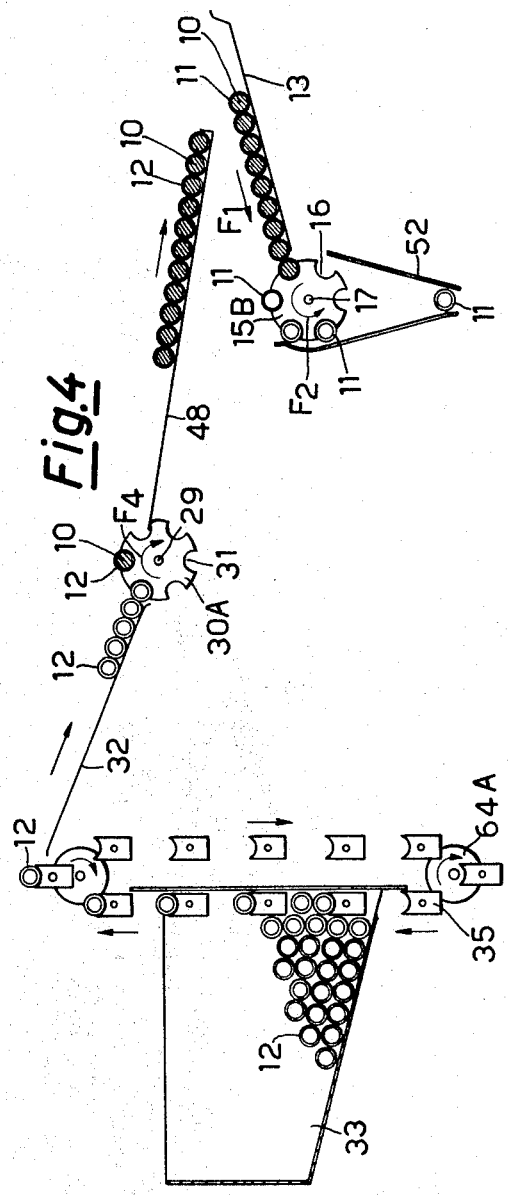
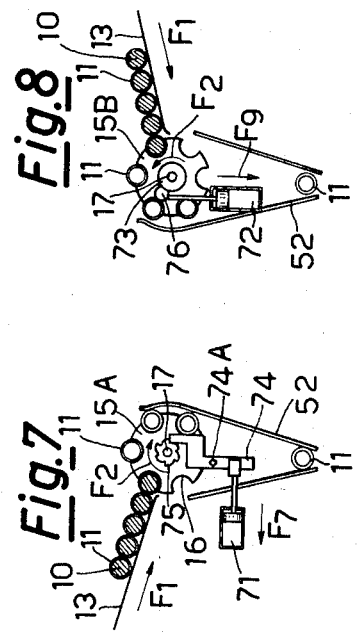
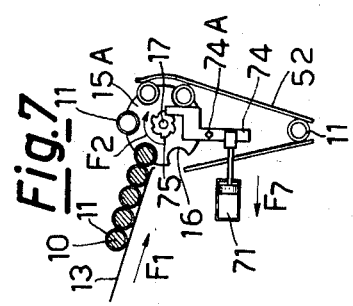
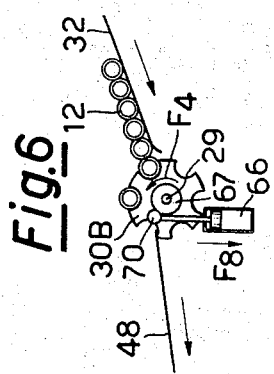
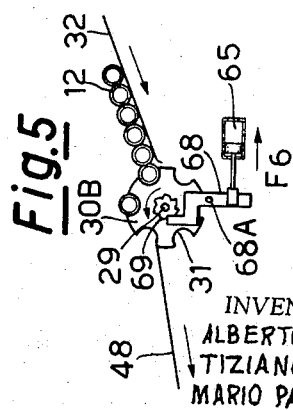
INVENTORS
ALBERTO LANZA
TIZIANO MILAN
MARIO PARACCHINI

United States Patent Office 3,530,565
Patented Sept. 29, 1970

3,530,565
DEVICE FOR REPLACING THE PLASTIC MATERIAL SHEATHS OF CYLINDRICAL SPOOLS AND METHOD THEREFOR
Alberto Lanza, Gozzano, Tiziano Milan, Bolzano Novarese, and Mario Paracchini, Borgomanero, Italy, assignors to Bemberg S.p.A., Milan, Italy, a company of Italy
Filed Dec. 27, 1967, Ser. No. 693,836
Claims priority, application Italy, Jan. 23, 1967, 11,140/67
Int. Cl. B23p 7/00, 11/02, 19/04
U.S. Cl. 29—401                                              9 Claims

ABSTRACT OF THE DISCLOSURE

A method and an apparatus are disclosed for stripping old sheaths of plastic material from thread winding spools and for replacing said old sheaths with new ones. An automatized sequence of operational steps, intermittently timed, is such as to remove the old sheaths by slipping them, without cutting, from the spools, whereas the new sheaths are slipped onto the spools, whereas the new manoeuvre. An electropneumatic assembly, operationally combined with appropriate conveyance mechanisms, conveys the spools lined with the old sheaths to a stripping station, and the bare spools in attunement with the new sheaths to a liner-applying station. The advantages consist in a fully automatic operation, and ancillary means are also provided for disposing of the worn out liners. Slipping of the new sheaths onto the attendant spools is facilitated by appropriate preheating means, such as infrared radiation bulbs.

---

This invention relates to a method and an apparatus for the automatic replacement of plastic material sheaths as used for covering the cylindrical spools adapted for winding threads and yarns, more particularly synthetic yarns.

It is known that, to wind synthetic threads, cylindrical spools of metal are conventionally used, which afford the necessary mechanical robustness, especially with respect to those synthetic yarns which exhibit a certain shrinking upon drawing, such as nylon.

The outer face of a spool is, moreover, coated by a removable sheath made of a plastic or like material, inasmuch as it has proven advantageous to impart to the spool surface certain particular properties by employing a readily replaceable material.

Plastic material sheaths for cylindrical spool, however, undergo with the lapse of time a certain wear, so that their replacement becomes imperative. Said replacement can be carried out, for example, by splitting the sheath along a generating line thereof and then slipping a new sheath on the spool.

Such a replacement, which is commonly carried out manually is, unfortunately, a long and expensive operation on account of a large number of sheaths to be currently replaced.

The advantage is thus obvious of having at hand both a method and an apparatus which are capable of performing said replacement operation automatically.

The object of the present invention is just to provide both a method and an apparatus adapted to carry out such an automatic replacement.

More detailedly, the method according to the present invention comprises the steps of gradually synchronously feeding the sheath-carrying spools to a first work station whereat the worn out sheaths are axially slipped out of their respective spools; automatically transferring the spools thus stripped of their sheaths, to a second work station; feeding new sheaths to be slipped on in synchronism with said spool transfer, and applying said new sheaths to said spools by axially slipping the latter onto the former in said second work station.

According to a preferred embodiment of the method of this invention, the new sheaths, immediately before being applied onto said spool at said second work station, are heated to an appropriate temperature, which is at least 10° C. below the softening point of the thermoplastic material which forms said sheaths, thus encouraging the slipping of the sheaths on account of the temporary thermoexpansion, as slight as it may be, that the sheaths undergo.

Said heating step can be carried out by any means as conventionally known in the art, such as a hot fluid, an electric resistor or otherwise, although heating with infrared radiations is the preferred way.

The apparatus according to the present invention as related to the method outlined in the foregoing, essentially comprises: Means for gradually and synchronously feeding the spools coated by worn out sheaths to said first work station; piston means adapted to slip said spools free of said worn out sheaths by engaging said spools only and urging them to an axial translational motion; means in said first station for dumping said worn out sheaths; conveying means for transferring said spools to be coated with new sheaths to a second work station; means for gradually feeding new sheaths in synchronism with the transfer motion of said spools to be coated with new sheaths; piston means concurrently acting on a spool and a new sheath at said second work station to impart an axial translational motion thereto so as to have said spool entering said new sheath, and means for discharging the spools coated by the new sheaths.

According to a preferred embodiment of the inventive device, in said second work station infrared lamp means are provided for heating the new sheaths, as they arrive at said second station and prior to their being slipped onto its attendant spool to be coated.

Means are further provided, at said first work station, which are adapted to receive the worn out sheaths removed from their respective spools, to subject them to a flattening, or crushing operation, in order to satisfy requirements inherent in space availability and disposal of scrap materials.

The objects and advantages of the present invention will become apparent and/or will be made quite clear in the ensuing detailed disclosure, reference being had to the accompanying drawings, wherein:

FIG. 2 is a view similar to that of FIG. 1, of the device as viewed from a side opposite to that of FIG. 1.

FIG. 3 is a diagrammatical showing of the electropneumatic control circuitry for governing the several operative steps of the device shown in FIG. 1.

FIG. 4 is a diagrammatical view of a few vital component parts of the device, as viewed in the direction of the arrow F of FIG. 2, and FIGS. 5, 6, 7 and 8 are diagrammatical illustrations of a few details of the device shown in FIGS. 1 and 2.

Figure 1:
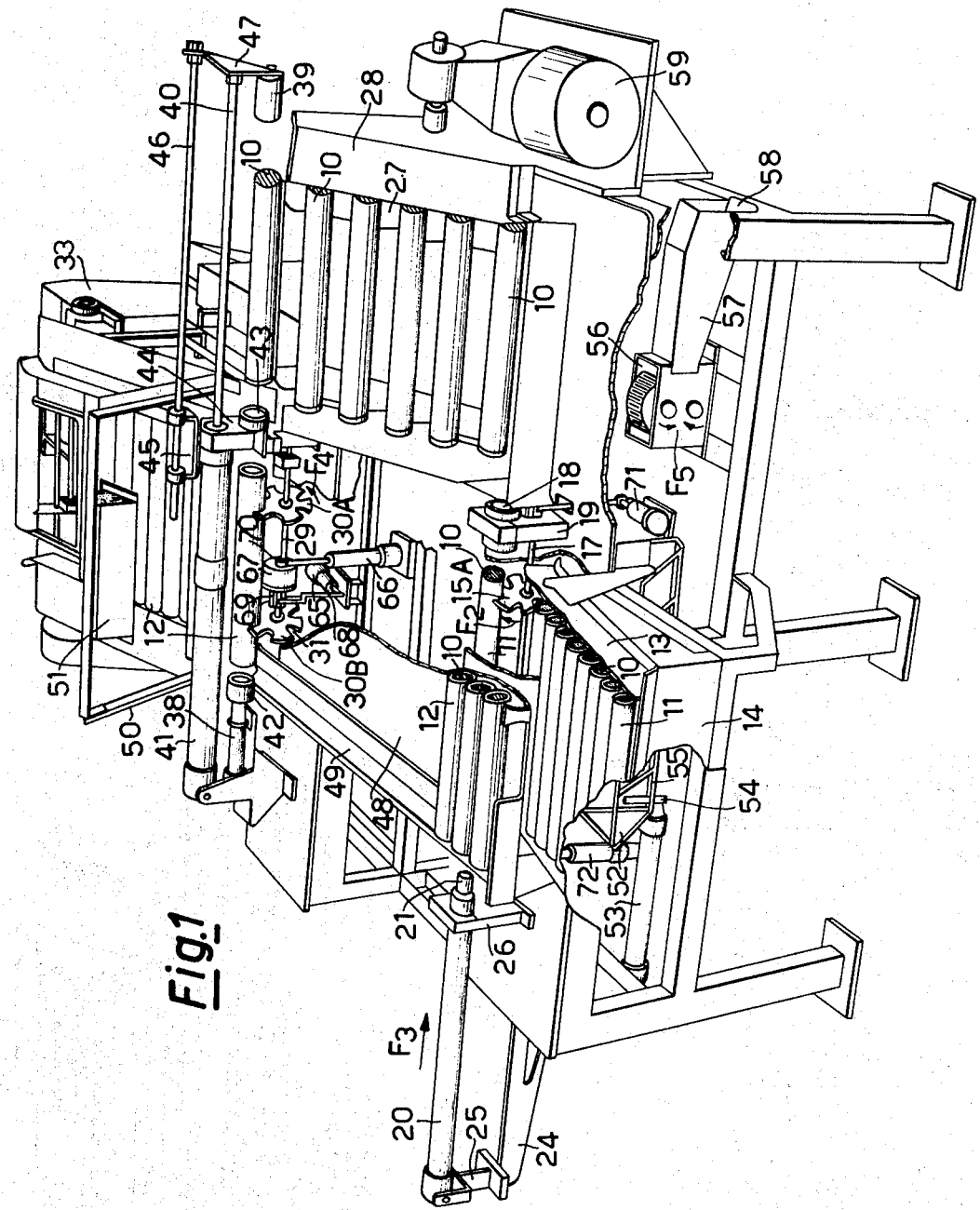
FIG. 1 is a perspective overall view, partly in section, of the inventive device.

Having now reference to the drawings, the numeral 10 indicates a metal spool, which preferably and usually is made of a ferrous metal, whereas, in order to afford a clearer disclosure and graphical showing, the numeral 11 indicates the worn-out sheaths to be replaced, and the numeral 12 is indicative of the new sheaths to be applied as liners to the spools 10. It should be observed, moreover, that the spools 10 are shown, to make the drawings clearer, as a solid body in cross-section, whereas they are hollow in the actual practice, or they may take any other shape as is conventional in the art. The spools 10, lined by the sheaths 11 to be replaced are loaded onto the slope or inclined plane 13, along which they are moved by the gravity pull in the direction of the arrow $F_1$ (FIG. 7), said slope 13 being borne by a supporting member 14.

At the lower end of the slope 13 there are two wheels 15A and 15B, whose peripheral surfaces are grooved at 16, the grooves having a semicircular outline matching with its diameter the outside diameter of the sheaths 11.

The wheels 15A and 15B are integrally and coaxially mounted with respect to a shaft 17 and are rotated in the direction of the arrows $F_2$. The wheels 15A and 15B are rotated through sequential steps of a preselected angular magnitude of a constant value, under the drive and the control of mechanisms to be described hereinafter. During said rotational motion, the wheels 15A and 15B, whose peripheral grooves are axially aligned, grip a spool 10 carrying its worn out sheath 11 and take it to the uppermost position, whereat they come into alignment with a bushing 18; the latter is housed in a supporting block 19, through which the shaft 17 is also passed.

The bushing 18 has a calibrated bore whose diameter is such as to permit that the spool 10 only, and not the sheath 11, may pass therethrough. In axial alignment with the bore of the bushing 18 and with the aforementioned uppermost position of said grooves 16 of the respective wheels 15A and 15B, a piston 20 is mounted, whose head 21 has a diameter which exactly matches the diameter of the spool 10, the piston being reciprocable in the direction of the arrow $F_3$. The piston 20 is supported by a bracket 24 and two rest blocks 25 and 26.

The mechanism which reciprocates the piston 20 and the head 21 is quite conventional and well known in the art; it will be described in connection with FIG. 3.

It is apparent that, as the head 21 of piston 20 is moved, it will axially shift the spool 10 with its sheath 11 until the latter comes to rest against the edge of the bushing 18, whereafter the continued thrust of the piston head will urge the spool 10 through the bore of the bushing and said spool will therefore be stripped on its sheath 11.

The removed sheath, during the return stroke of the head 21, is restored to the initial position of the grooves of the wheels 15A and 15B by an appropriate number of leaf springs (not shown in the drawings), fastened to the head 21 and capable of engaging the sheath during progress of the return stroke of the piston 20. During said return stroke, the sheath 11 is stopped, as it reaches its starting position again, by another bushing (not shown in the drawings), which has a bore diameter less than the diameter of the sheath, whereas the stem of the piston 20, being unthreaded from the sheath 11, completes its return stroke.

The spool 10, which has been stripped of its sheath 11 as outlined above, has been passed onto a conveyor 27, mounted on a sloping support 28. The conveyor 27 can be of any kind adapted gradually to transfer the spools 10 up to the top of the support 28, in readiness for being lined with a new sheath 12 as will be described hereinafter.

In a position which is in axial alignment with the top of the support 28, a second shaft 29, is catered for: it rotatably supports a couple of wheels 30A and 30B, identical with the wheels 15A and 15B and having similar grooves 31.

The wheels 30A and 30B are fed by an inclined plane 32, from which the wheels 30A and 30B received the new sheaths 12 to be engaged by the grooves 31.

In order to feed the sheaths 12 to the inclined plane 32 a feed mechanism is provided, which takes the new sheaths 12; these are held in a container 33, supported by a supporting bracket 34. The sheaths 12 are taken from the container 33 by supports 35 which are mounted, in regular preselected and spaced-apart relationship, on a chain elevator 36, driven in a way to be described hereinafter. As the sheath 12, carried by the supports 35 of the elevator 36, attains its top position, it is dumped, by virtue of the reversal of motion of the elevator 36, into the chute 32; there, it is guided by guides 37 which protrude from the inclined plane 32.

In axial alignment with the top position of the grooved wheels 30A and 30B, as well as with the tops of the support 28 and the conveyor 27, a twin-piston assembly 38 and 39 is catered for. The piston 39 is actuated through a stem 40, which is slidably received within an actuating cylinder 41, as will be described hereinafter.

As a sheath 12, as aforementioned, attains the top position of the grooved wheels 30A and 30B, while the spool to be lined concurrently attains the top position of the support 28, the piston 38 axially urges, with its head 42, the sheath 12 against a bushing 43 (mounted in a supporting member 44) which has a bore diameter such as to allow the spool 10 only to pass therethrough, but not the sheath 12.

At the same time, the piston 39, as driven by the stem 40, engages the spool 10 and thrusts it axially, forcing it to pass through the bore of the bushing 43 and then to enter into the sheath 12.

At this stage, the piston, 39, acting against the urge of the piston 38, restores the spool 10, now lined with the sheath 12, to the position formerly occupied by the same sheath 12 in the grooves of the wheels 30A and 30B, whereupon the pistons 38 and 39 are returned to their starting positions.

The support 44 has a bore, through which the stem 40 is allowed to slide, and supports a two-pronged bracket 45 in which a second stem 46 is slidably received. The stem 46 is intended to support the stem 40 by means of a gusset plate 47 solid with the stem 46, the stem 40 and the piston 39.

As the rotation of the grooved wheels 30A and 30B is continued in the direction of the arrow $F_4$, the spool 10, lined with a new sheath 12, is discharged onto the inclined plane 48 having guides 49 and is subsequently taken out from said plane.

Above the chute 32 a framing 50 is provided, to which an infrared bulb 51 is fastened, in order to heat the new sheaths 12 to a temperature which is at least 10° C. below the softening temperature of the thermoplastic resin the sheaths are made of.

Reverting now to the unthreading station of the worn out sheaths 11 from the spools 10, there is provided, just beneath the grooved wheels 15A and 15B, a basket 52 intended to collect the sheaths 11, as they are stripped from the spools 10, whereas the wheels 15A and 15B continue their rotations in the direction of the arrow $F_2$. The basket 52 has downwardly convering walls, so that the worn out sheaths 11 are conveyed downwardly until they reach a position at which they are engaged by a piston 53. To the stem of said piston a rod 54 is affixed, which slides between the guides 55 forming the bottom of the basket 52. The rod 54, during the reciprocation of the piston 53, and being driven at appropriate intervals as will be described in connection with FIG. 3, drives the worn-out sheath 11 out of the basket 52, and causes the sheath to enter a device 56, consisting of a couple of gears which mesh with one another and are rotated in the direction of the arrows $F_5$ in FIG. 1. The worn out sheath is thus flattened, perhaps even crushed, by the two meshing gears and is dumped outside through the duct 57 and the port 58.

To drive the conveyor 27, a motor 59 is catered for, for example of the self-braking type, which has a stepwise mode of operation, inasmuch as it should be stopped as a spool 10 reaches the top of the inclined plane 28 to undergo the relining operation. The duration of the stopping time for the motor 59 is controlled by an appropriate, conventional relay, which in turn, is controlled by means which are responsive to the travel of the spools along the sloping support.

In quite similar a way, the chain elevator 36, carrying the supports 35, is driven by a motor 60 via a chain drive 61 which actuates a shaft 62: a pair of gears 63A and 63B is keyed to said shaft. Two driving gears 64A and 64B (the latter is not shown) are further provided. The speed of the motor 60 is adjusted so that the feed of the sheaths 12 to the chute 32 may take place in a way which is in attunement with the speed at which the spools 10 are lined with their respective new sheaths. It is preferred for reasons of safety, that the operation of the motor 60 be controlled by means responsive to the passing of the sheaths on the chute 32.

To obtain the gradual rotational motion of the shaft 29 and the grooved wheels 30A and 30B, there are provided the pistons 65 and 66, the free-wheel 67, the manipulating rod 68 pivoted about an intermediate point 68A, and the gear 69 integral with the shaft 29.

The piston 65, which is connected to the lower end of the manipulating rod 68, by rotating said rod about its intermediate pivotal point 68A, removes the head of the rod 68 preventing it from engaging the gear 69, while the stem of the piston 66 connected by an articulation to a pin 70 (eccentrically affixed to the freewheel 67), begins a descending motion. By virtue of these movements, the shaft 29 and the grooved wheels 30A and 30B are rotated through a fixed angular amplitude which corresponds to the length of the stroke of the stem of piston 66. As soon as the shaft 29, under the drive of piston 66, has started its rotation in the direction of the arrow $F_4$, the piston 65 is brought back to its starting position under the bias of a spring, so that the engagement of the manipulating rod 68 with the subsequent tooth of the gear 69 may take place only on completion of a rotation through a constant and preselected angular amplitude. At this stage, the stem of the piston 66 is lifted to its upper dead center again.

It should be noticed that the free-wheel 67 is of the frictional type so that it rotates the shaft 29 in the direction of the arrow $F_4$ only.

The repetition of this cycle originates a stepwise motion, according to constant and preselected angular amplitudes, of the wheels 30A and 30B. The attunement of the motions of the pistons 65 and 66 will be made clear in the description of FIG. 3. Likewise, there is provided for the grooved wheels 15A and 15B integral with the shaft 17 an identical assembly of pistons 71 and 72 (corresponding to pistons 65 and 66 respectively), freewheel 73, manipulating rod 74 pivoted at 74A, gear 75 and pin 76. The latter is eccentrically affixed to the freewheel 73.

The details of the mechanisms mentioned above are best seen in FIGS. 5, 6, 7 and 8. Considering now FIG. 3, the solid line tracings are indicative of the pneumatic circuitry, whereas the dotted line tracings are indicative of the electric circuitry.

As shown, an electric current supply is provided, which feeds a step-by-step relay 77, whose contactor 78 rotates in the direction of the arrow $F_{12}$ and is actuated similarly to the programming and timing devices adopted in washing machines; said contactor is automatically and sequentially positioned at I, II, III and IV. When the relay 77 is on by closing the main switch 81, the contactor 78 is first brought to the position I wherein it energizes a magnetic valve $V_1$. The latter, then, feeds with air under pressure, coming from a general service manifold 80, the pipings 65A and 71A for actuating the attendant pistons 65 and 71, respectively. By so doing, the rods 68 and 74 set their respective gears free, 69 and 75, as a consequence of the motion of said pistons 65 and 71 in the direction of the arrows $F_6$ and $F_7$ of FIGS. 5 and 7.

Meanwhile, the contactor 78 is brought to the position II, wherein it energizes the magnetic valves $V_2$ and $V_3$, which send air under pressure, via the pipings 72A and 66A, to the pistons 72 and 66, respectively. As soon as the pistons 66 and 72 have primed the rotation of the shafts 17 and 29, the magnetic valve $V_1$ is de-energized and the pistons 65 and 71 are restored to their initial positions by virtue of calibrated springs contained therein.

These pistons are thus urged to be shifted along the directions of the arrows $F_8$ and $F_9$ and thus the shafts 29 and 17, by the agency of the linkage between the stems of said pistons, the pins 70 and 76 and the freewheels 67 and 73, are driven to rotation in the direction of the arrows $F_4$ and $F_2$.

As the pistons 66 and 72 reach their ends of stroke, they energize two switches (not shown in the drawings) so that the magnetic valves $V_2$ and $V_3$ are de-energized and the compressed air feed to the pistons 66 and 72 takes place through the pipings 66B and 72B, to bring said pistons to their respective starting positions again.

Meanwhile, the contactor 78 has been brought to the position III, wherein it energizes the magnetic valves $V_4$ and $V_5$. These connect the pneumatic circuitry to the pistons 20, 38 and 41. More accurately, the magnetic valve $V_4$ feeds, via piping 20A, with compressed air the piston 20 so that the head 21 is moved in the direction of the arrow $F_3$, thus forcing the spool 10 to pass through the bushing 18. The magnetic valve $V_5$ feeds, in turn, with compressed air, via the piping 82A and the branched ducts 24A and 41A, the pistons 38 and 41. These will thus be moved in the direction of the arrows $F_{10}$ and $F_{11}$, respectively.

As the piston 41 reaches its end of stroke, the contactor 78 is shifted to its position IV.

Consequently, the magnetic valves $V_4$ and $V_5$ are de-energized and feed with compressed air the pistons 20 and 41, via the pipings 20B and 41B, so that the pistons are brought to their initial positions again. The piston 38, contrarywise, returns to its initial position by virtue of a spring (not shown) which acts in a direction opposite to that of the arrow $F_{10}$.

The contactor 78, in the position IV, energizes the magnetic valve $V_6$, and the latter actuates the piston 53 by means of compressed air fed through the piping 53A, in the direction of the arrow $F_{12}$.

As the pistons 20 and 41 are meanwhile returned to their initial positions, they actuate switches which restore the contactor 78 in the zero position. Meanwhile, the magnetic valve $V_5$ is de-energized and brings the piston 53 to the initial position again by feeding it with air under pressure through the piping 53B. At this stage, the initial conditions are restored once more and, if the switch 81 is actuated again, or if it stays in the ON position, the cycle is repeated as described above.

Be it understood that in the foregoing disclosure and drawings a preferred embodiment has been described; but other mechanical equivalents are possible within the scope of the invention.

It should be emphasized, in addition, that the description of a few component parts of the electrohydraulic circuitry has been simplified or dispensed with since these are well known in the art, without implying that, for this reason, the invention should be limited to the details shown herein.

For example, the assembly formed by the piston 65, manipulating rod 68 and gear 69 could be replaced by another nonreturn holding pawl mechanism acting on a gear wheel.

The embodiments of the invention in which an exclusive property or privilege is claimed are defined as follows:

1. A method for replacing the worn out sheaths of thermoplastic material used for winding threads and yarns, more particularly synthetic yarns, characterized by the sequential performance of the steps of gradually feeding spools carrying the sheaths to be replaced to a first work station wherein the spools are axially stripped of their worn out sheaths, transferring the spools, so stripped of their sheaths, to a second work station; feeding in attunement with the transfer of said spools, new sheaths to be applied, heating said new sheaths in said second work station to a temperature which is at least 10° C. below the softening temperature of the thermoplastic material which forms said sheaths and applying said new sheaths to said spools by axial introduction thereof in said second work station.

2. A method according to claim 1, characterized in that said heating step is carried out with an infrared radiation bulb.

3. An apparatus for replacing worn out sheaths of thermoplastic material used for winding threads and yarns, more particularly synthetic yarns, characterized in comprising, in an automatically operable assembly, means for gradually and synchronously feeding individual spools lined with worn out sheaths to a first work station, piston means adapted to unthread said spools from said worn out sheaths by engaging said spools only and driving them to an axial shifting movement, means in said first station for dumping said worn out sheaths, conveying means for transferring said spools to be lined anew to a second work station, means for gradually and synchronously feeding new sheaths, in attunement with said transfer motion of said spools to be lined anew, to said second work station, piston means concurrently acting upon a spool and a new sheath in said second work station to effect an axial shifting movement of said spool relative to said sheath, so that the former enters the new sheath, and means for discharging the spools lined with their new sheaths.

4. An apparatus according to claim 3, characterized in that heating means are provided for said new sheaths in said second work station.

5. An apparatus according to claim 4, characterized in that said heating means consist of an infrared ray bulb.

6. An apparatus for replacing sheaths of plastic material of cylindrical spools used for winding synthetic yarns according to claim 1, characterized in that, in an automatically operable assembly, the spools lined with the sheaths to be replaced are individually and sequentially taken by two coaxial grooved wheels, arranged symmetrically on a shaft in said first work station and intermittently rotatable integrally with their shaft through predetermined and constant angles of rotation, said spools being horizontally positioned in the respective grooves, the spools being individually and sequentially brought to a position so that the axis of the spool coincides with the axis of a bushing placed in the vicinity of either end of the spool, the diameter of the bore of said bushing being greater than the outside diameter of the metal spool, but smaller than the outside diameter of the sheaths, the spools being stopped for a determined time interval in said position, the spools being driven during the stoppage time, by a piston which acts along the axis of the spools, first against said bushing, and then the metal spools alone are thrust through the bushing so as to carry out the complete ejection of the metal spool from the sheath, which latter is dropped as the motion of the grooved wheels is taken over again, the metal spools stripped of their sheaths being forwarded to a new horizontal position in said second work station, wherein the axis of the spool coincides with the axis of a new sheath, arranged in the vicinity of either end of the spool, the new sheath having been brought to said position by a wheel having coaxial grooves arranged symmetrically in said second work station on a shaft and intermittently rotatable integrally therewith, according preselected and constant angles of rotation, a bushing being further inserted between the spool and the new sheath, in a coaxial manner, the diameter of the bore of the bushing being greater than the outside diameter of the metal spool but smaller than the outside diameter of the sheath, the metal spools being arrested for a determined time interval in said position, the metal spools being thrust, during the stoppage time, through said bushing by a piston which acts along the axis of the spool, whereas a second piston, acting along the same axis, urges the new sheath against the bushing, so that the spool enters the new sheath and is lined thereby completely, the spools lined with their new sheaths being dropped as the movement of the grooved wheels is taken over again.

7. An apparatus according to claim 6, characterized in that the sheaths ejected from their spools are thrust between two moving meshing gears and thus reduced into undulated thin sheets.

8. A method for replacing the worn out sheaths of thermoplastic material used for winding threads and yarns, more particularly synthetic yarns, characterized by the sequential performance of the steps of gradually feeding spools carrying the sheaths to be replaced to a first work station in a given path; axially applying force to the spools only stripping them of their worn out sheaths and moving them into a second path removed from said given path; transferring the spools, so stripped of their sheaths, along said second path to a second work station; feeding in attunement with the transfer of said spools, new sheaths to be applied into said second work station, and axially applying force to said spools to remove them from said second path and axially introduce them into said new sheaths in said second work station.

9. A method according to claim 8, characterized in that said new sheaths in said second work station are heated to a temperature which is at least 10° C. below the softening temperature of the thermoplastic material which forms said sheaths.

References Cited

UNITED STATES PATENTS

| | | |
|---|---|---|
| 1,660,538 | 2/1928 | Whitney. |
| 3,289,973 | 12/1966 | Spencer _ _ _ _ _ _ _ _ _ _ 29—447 X |
| 3,394,453 | 7/1968 | Wallace et al. _ _ _ _ _ _ 29—447 X |

THOMAS H. EAGER, Primary Examiner

U.S. Cl. X.R.

29—200, 208, 429, 447

PO-1050
(5/69)

UNITED STATES PATENT OFFICE
CERTIFICATE OF CORRECTION

Patent No. 3,530,565    Dated September 29, 1970

Inventor(s) ALBERTO LANZA - TIZIANO MILAN and MARIO PARACCHINI

It is certified that error appears in the above-identified patent and that said Letters Patent are hereby corrected as shown below:

Col. 1, line 9, read "Jan. 23, 1967" as -- Jan. 3, 1967 --

SIGNED AND
SEALED
DEC 15 1970

(SEAL)
Attest:

Edward M. Fletcher, Jr.
Attesting Officer

WILLIAM E. SCHUYLER, JR.
Commissioner of Patents